(12) United States Patent
Karaoguz et al.

(10) Patent No.: US 8,447,676 B2
(45) Date of Patent: *May 21, 2013

(54) BILLING SUPPORT IN A MEDIA EXCHANGE NETWORK

(75) Inventors: Jeyhan Karaoguz, Irvine, CA (US); James D. Bennett, Laguna Beach, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/326,601

(22) Filed: Dec. 15, 2011

(65) Prior Publication Data

US 2012/0233632 A1    Sep. 13, 2012

Related U.S. Application Data

(63) Continuation of application No. 10/667,036, filed on Sep. 22, 2003, now Pat. No. 8,082,198.

(60) Provisional application No. 60/467,867, filed on May 5, 2003, provisional application No. 60/432,472, filed on Dec. 11, 2002, provisional application No. 60/443,894, filed on Jan. 30, 2003.

(51) Int. Cl.
*G06Q 40/00*    (2012.01)

(52) U.S. Cl.
USPC .............................................. 705/35; 705/40

(58) Field of Classification Search
USPC ................................................ 705/35, 38, 40
See application file for complete search history.

(56) References Cited

U.S. PATENT DOCUMENTS 6,388,714 B1 *    5/2002    Schein et al. ................. 348/563

OTHER PUBLICATIONS

Fischetti, Mark, "The Future of TV" Technology Review (Nov. 2001), p. 35-40.*

* cited by examiner

*Primary Examiner* — Lalita M Hamilton
(74) *Attorney, Agent, or Firm* — Garlick & Markison; Edward J. Marshall

(57) ABSTRACT

A system providing billing support for the exchange of media is disclosed. An embodiment of the present invention may provide for the authorization of and billing for the delivery of media from a media server to local storage for consumption on a television display. The media may be audio, still pictures, video, or data. Other embodiments may provide for the authorization of and billing for the transfer of media from a media peripheral to a media server for media backup or distribution. A media peripheral may be, for example, a digital camera, digital camcorder, personal computer (PC), personal digital assistant (PDA), multi-media gateway, and MP3 player. An embodiment may support pre-payment, payment at time of use, and post-use billing for the media exchange. In an embodiment of the present invention, the storing or accessing of media may be performed without identifying the user to the media server.

20 Claims, 14 Drawing Sheets

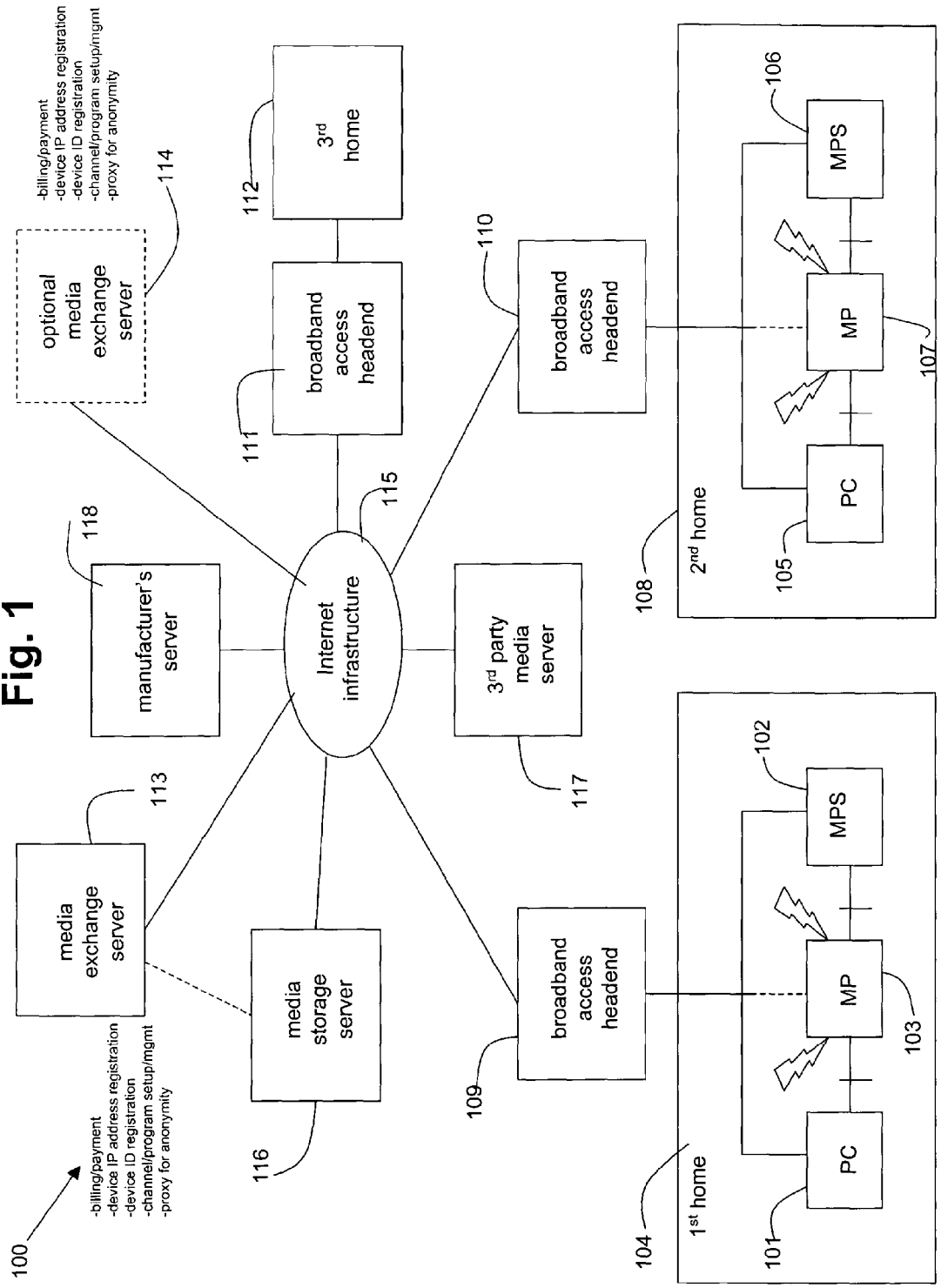

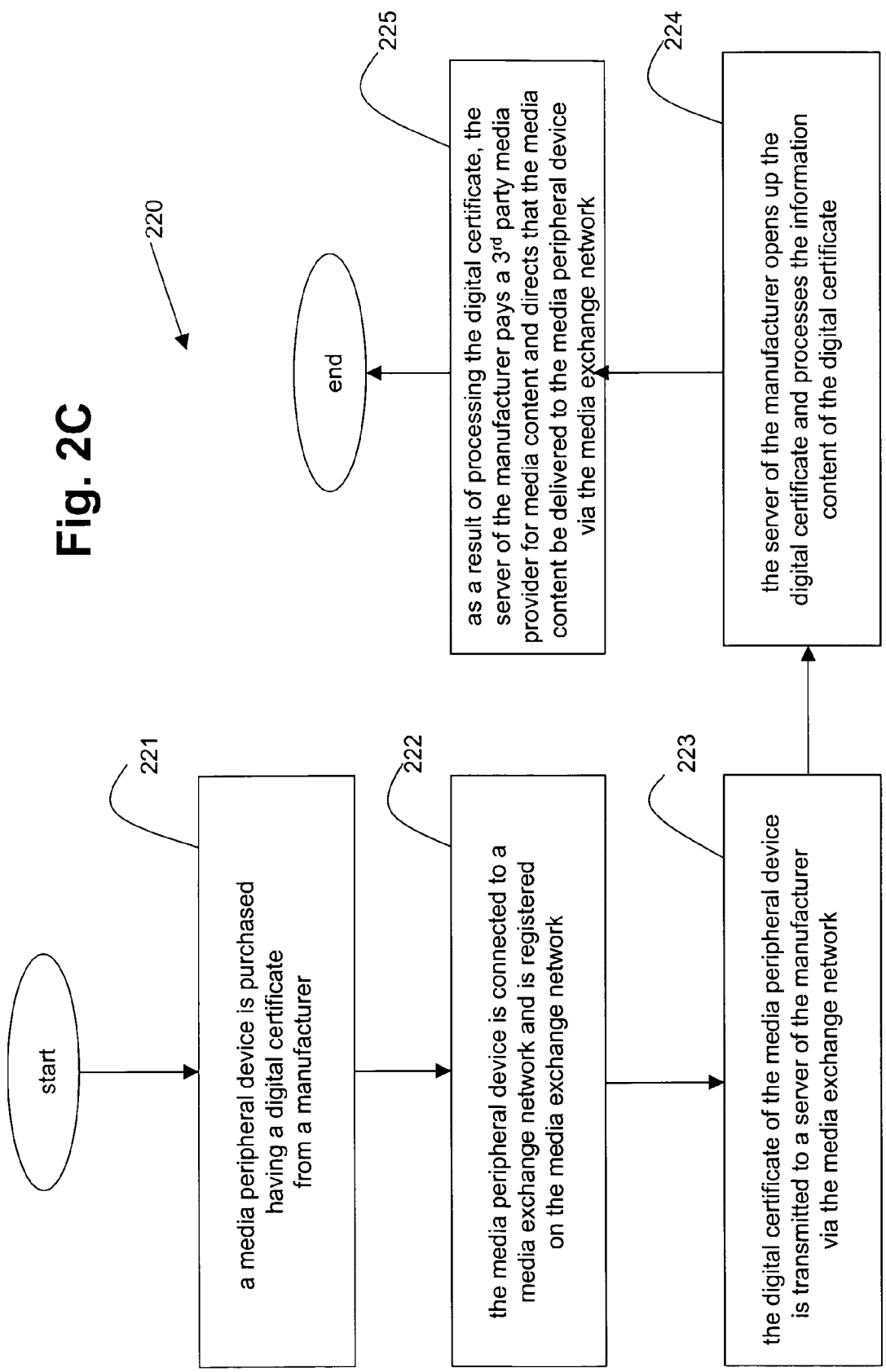

| CHANNEL LINE UP | HOUR, DAY | | | | |
|---|---|---|---|---|---|
| | <<1PM | 2PM | ... | 6PM | 7PM> |
| FAMILY VACATIONS | | | | | |
| KID's SPORTS | | | | | |
| ... | | | | | |
| VACATION in ALASKA VIDEO 802 | Normal Estimated Delivery Time: 2 hrs 13 min Cost: 59c (without Queuing) | | | Showing All Day (48 Min), Earliest Order Time: 4:00PM MPEG-2 1.5 Mbps | |
| VACATION in ALASKA VIDEO 803 | Express Estimated Delivery Time: 18 min Cost: $1.2 (with Queuing) | | | Showing All Day (48 Min), Earliest Order Time: 4:00PM MPEG-2 4 Mbps | |
| VACATION in ALASKA VIDEO 804 | Overnight Delivery: Avail. Nxt Morning Cost: 5c (Server Stored) | | | Showing All Day (48 Min), Earliest Order Time: 4:00PM MPEG-2 19 Mbps | |

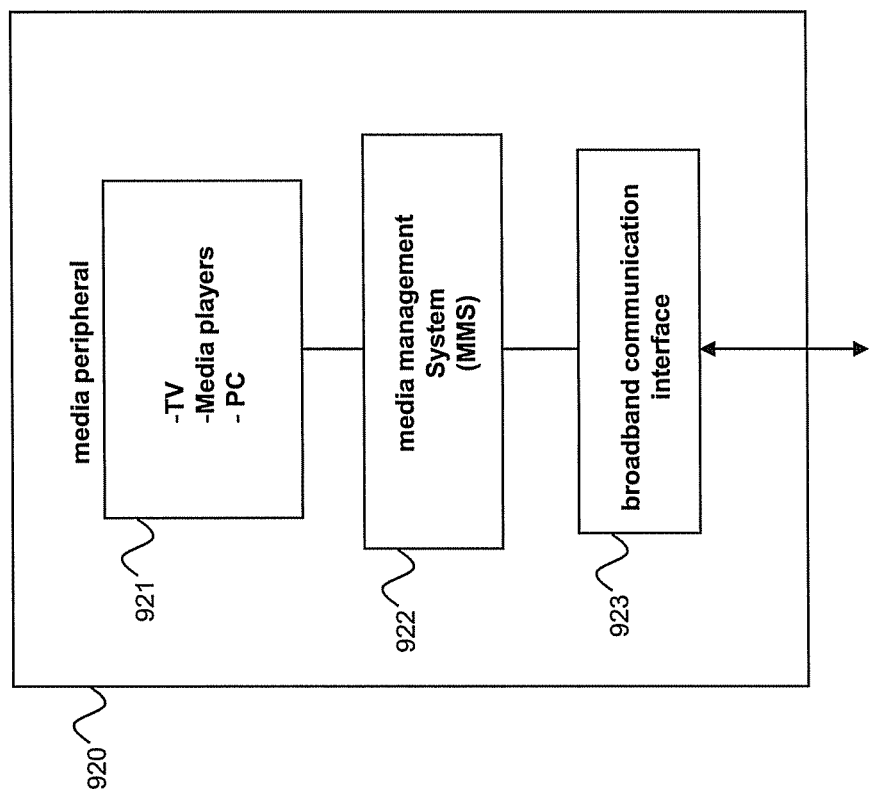

BILLING SUPPORT IN A MEDIA EXCHANGE NETWORK

CROSS-REFERENCE TO RELATED APPLICATIONS/INCORPORATION BY REFERENCE

This application is a continuation of U.S. patent application Ser. No. 10/667,036, entitled "Billing Support In A Media Exchange Network," filed Sep. 22, 2003, now U.S. Pat. No. 8,082,198, issued Dec. 20, 2011, which makes reference to, claims priority to, and claims the benefit of U.S. Provisional Patent Application 60/467,867, entitled "Billing Support In A Media Exchange Network", filed May 5, 2003, U.S. Provisional Application Ser. No. 60/432,472, entitled "Personal Inter-Home Media Exchange Network", filed Dec. 11, 2002, and U.S. Provisional Application Ser. No. 60/443,894, entitled "Personal Access And Control Of Media Peripherals On A Media Exchange Network", filed Jan. 30, 2003, the complete subject matter of which are hereby incorporated herein by reference, in their entirety. In addition, the applicants hereby incorporate the complete subject matter herein by reference, in their entirety, of U.S. Provisional Patent Application Ser. No. 60/461,717, entitled "Secure Media Peripheral Association With Authentication In A Media Exchange Network", filed Apr. 10, 2003, and U.S. Provisional Patent Application Ser. No. 60/457,179, entitled "Server Architecture Supporting A Personal Media Exchange Network", filed Mar. 25, 2003. In addition this application makes reference to U.S. patent application Ser. No. 10/657,390, entitled "Personal Inter-Home Media Exchange Network", filed Sep. 8, 2003, now U.S. Pat. No. 7,496,647, issued Feb. 24, 2009, and U.S. patent application Ser. No. 10/660,267, entitled "Personal Access And Control Of Media Peripherals On A Media Exchange Network", filed Sep. 11, 2003, now U.S. Pat. No. 7,496,665, issued Feb. 24, 2009, the complete subject matter of which are hereby incorporated herein by reference, in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Today, people may subscribe to a cable TV service or a satellite TV service over the telephone or over the Internet using a PC (personal computer). Billing may be done by the service provider on a monthly basis. Different media packages are typically available, allowing a user to choose between a limited number of options that provide greater or fewer viewing channels. Typically, a user ends up with certain channels that he would rather not have, but must pay for anyway because they are a part of the package.

For example, a basic package may be offered providing standard cable and broadcast channels. This may be the least expensive option. Other options may include the basic package along with certain premium movie channels and/or premium cable channels. These more premium packages are more expensive than the basic package. Also, authorization to view special pay-per-view events may be available for purchase and consumption through the service provider.

It can often be difficult to cancel a cable or satellite service. A user may have to wait on hold on a telephone for a long period of time. Also, the user may have to pay a cancellation fee, depending on the details of his service contract and the time of the month that he cancels.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention may be found in a system providing billing support for the exchange of media. Such a system may comprise a first television display in a first home of a first user, and a first storage in the first home, the first storage supporting media consumption by the first television display in the first home, and having a first network protocol address. An embodiment of the present invention may comprise a user interface, at the first home, having at least one user defined media channel. Each of the at least one user defined media channel may comprise a sequence of user selected and scheduled media, and the user interface may support selection and scheduling of the media. An embodiment of the present invention may also comprise at least one server storing the media and having a second network protocol address, and server software that receives from the first home via a communication network a request for the delivery of media. The request may comprise information securing payment for delivery, and the server may respond by coordinating the delivery of the media from the at least one server at the second network protocol address to the first storage at the first network protocol address for consumption by the first television display.

In an embodiment of the present invention, the media may comprise at least one of audio, a still image, video, and data, and the first and second network protocol addresses may be one of an Internet protocol (IP) address, a media access control (MAC) address, and an electronic serial number (ESN). The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure, and the communication network may be the Internet. The consumption may comprise at least one of playing digitized audio, displaying a still image, displaying video, and displaying data.

In an embodiment in accordance with the present invention, the information securing payment for delivery may comprise at least one of a device ID, a public key for encryption, information related to services, information regarding payment terms, information regarding billing, and media push/access restrictions and limitations. In another embodiment, the information securing payment for delivery may be received via the communication network from a second user at a second home.

An embodiment of the present invention may comprise at least one media peripheral communicatively coupled to the first storage. The at least one media peripheral may provide at least a portion of the information securing payment for delivery, and the media may be delivered to the at least one media peripheral. The at least one media peripheral may comprise at least one of a digital camera, a digital camcorder, a television, a personal computer, a CD player, a home juke-box, a multi-media gateway device, a multi-media personal digital assistant, a DVD player, a tape player, and a MP3 player. The identity of a user receiving media may be unknown to the at least one server.

Additional aspects of the present invention may be found in a system providing billing support for the exchange of media. An embodiment in accordance with the present invention may comprise a first storage in the first home, the first storage supporting media consumption, and having an associated first protocol address. It may also comprise a second television display in a second home having an associated second protocol address. An embodiment of the present invention may comprise a user interface, at the first home. The user interface may have at least one user defined media channel, and each of the at least one user defined media channel may comprise a sequence of user selected and scheduled media. The user interface may support selection and scheduling of the media.

An embodiment of the present invention may also comprise at least one server storing the media, and server software that receives from the first home at the associated first protocol address, via a communication network, a request for the delivery of the media. The request may comprise information securing payment for delivery, and the at least one server may respond by coordinating the delivery of the media from one of the first storage and the at least one server to the second television display at the associated second protocol address for consumption.

The media in an embodiment of the present invention may comprise at least one of audio, a still image, video, and data, and the first and second protocol addresses may be one of an Internet protocol (IP) address, a media access control (MAC) address, and an electronic serial number (ESN). The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure. The communication network may be the Internet.

In an embodiment in accordance with the present invention, the at least one server may comprise at least one of a 3rd party service provider, a media storage server, and a broadband head end, and the identity of a user receiving media may be unknown to the at least one server. The information securing payment for delivery may comprise at least one of a device ID, a public key for encryption, information related to services, information regarding payment terms, information regarding billing, and media push/access restrictions and limitations. In addition, an embodiment of the present invention may comprise at least one media peripheral communicatively coupled to the set top box circuitry, and the at least one media peripheral may provide the media. The at least one media peripheral may comprise at least one of a digital camera, a digital camcorder, a television, a personal computer, a CD player, a home juke-box, a multi-media gateway device, a multi-media personal digital assistant, a DVD player, a tape player, and a MP3 player. In an embodiment in accordance with the present invention, at least one of billing and payment may be secured before delivery of the media occurs.

Further aspects of the present invention may be observed in a system providing billing support for the exchange of media. Such a system may comprise a first storage in the first home, a second television display in a second home, and a user interface having at least one user defined media channel comprising a sequence of user selected and scheduled media, the user interface supporting selection and scheduling of the media. An embodiment of the present invention may also comprise at least one server storing the media, and server software that receives a request for the delivery of the media. The request may comprise information securing payment for delivery, and the server may respond by coordinating the delivery of the media from one of the first storage and the at least one server to the second television display for consumption.

The media in an embodiment in accordance with the present invention media comprise at least one of audio, a still image, video, and data. The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure. The identity of a user receiving media may be unknown to the at least one server.

An embodiment of the present invention may also comprise at least one media peripheral communicatively coupled to the first storage, and the at least one media peripheral may act as one of a source or a destination for the media. The at least one media peripheral may comprise at least one of a digital camera, a digital camcorder, a television, a personal computer, a CD player, a home juke-box, a multi-media gateway device, a multi-media personal digital assistant, a DVD player, a tape player, and a MP3 player.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1 is a diagram illustrating an embodiment of a media exchange network comprising an architecture to support billing and payment for media services, in accordance with various aspects of the present invention.

FIG. 2C is a flowchart of an embodiment of a method using a digital certificate within a media peripheral device to obtain media content via a manufacturer of the device, in accordance with various aspects of the present invention.

FIG. 8 is an exemplary illustration of a TV guide channel user interface showing several options of a pushed media in accordance with an embodiment of the present invention.

FIG. 9B illustrates an alternative embodiment of a media processing system (MPS) in accordance with various aspects of the present invention.

DETAILED DESCRIPTION OF THE INVENTION

Figure 2A:
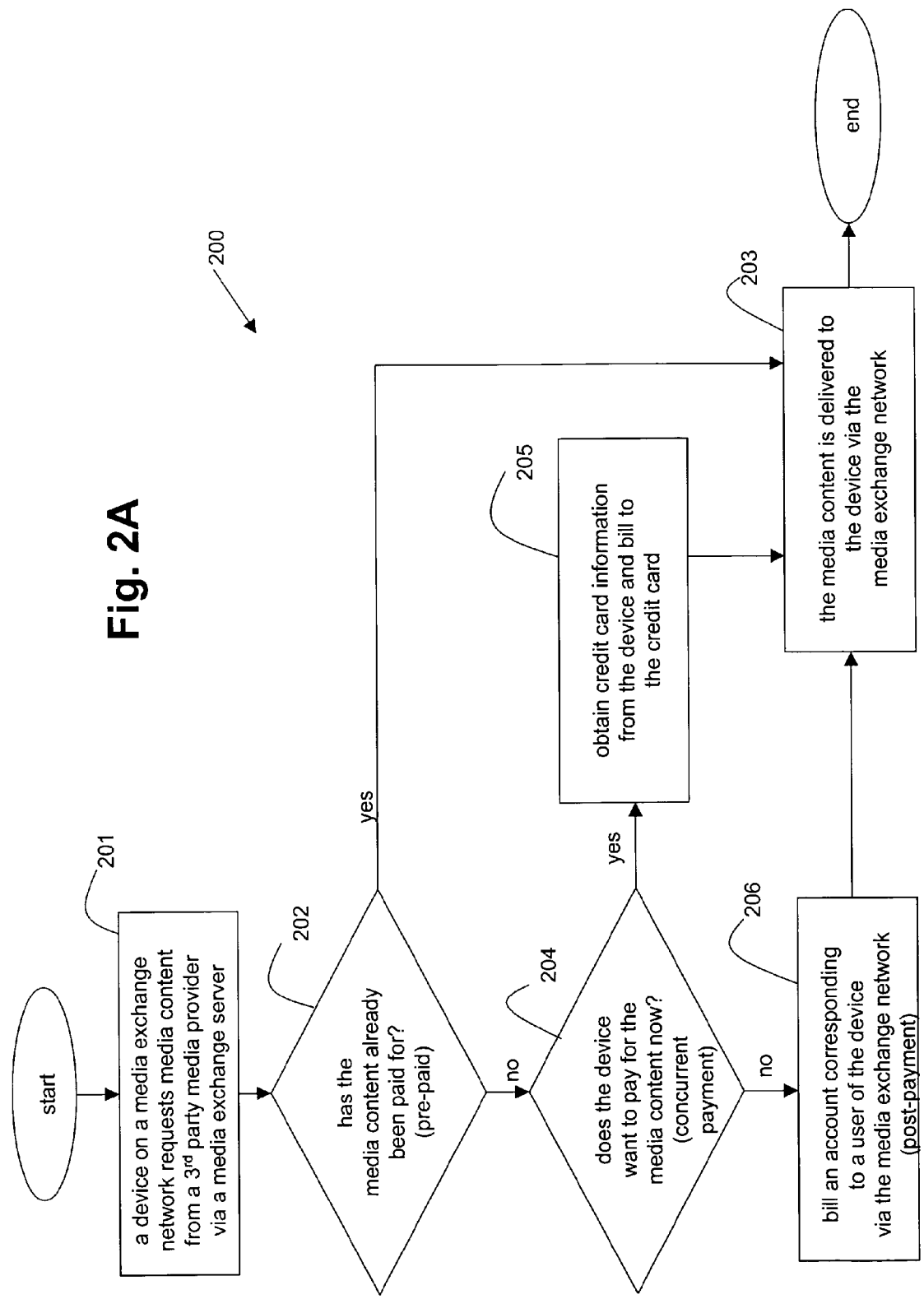
FIG. 2A is a flowchart illustrating an embodiment of a method to perform billing and payment for media services on the media exchange network of FIG. 1, in accordance with various aspects of the present invention.

FIG. 1 is a diagram illustrating an embodiment of a media exchange network 100 comprising an architecture with functionality to support user billing, payment, and authorization for media services, in accordance with various aspects of the present invention. Specifically, the media exchange network 100 is a communication network comprising a PC 101, a MPS (media processing system) 102, and at least one MP (media peripheral) 103 at a $1^{st}$ home 104; a PC 105, a MPS 106, and at least one MP 107 at a $2^{nd}$ home 108. The MP 103 interfaces to the PC 101 and/or the MPS 102 via, for example, a wireless link or a wired link (e.g., a USB connection). The PC 101 and the MPS 102 interface to a broadband access headend 109. The broadband access headend 109 may comprise a cable headend, a satellite headend, or a DSL headend, in accordance with various embodiments of the present invention. As an option, the MP 103 may interface with the broadband access headend 109. The PC 101, MPS 102, and/or MP 103 may include internal modems (e.g., a cable modem or DSL modem) or other interface devices in order to communicate with the broadband access headend 109. Optionally, the interface device (e.g., modem) may be external to the PC 101, MPS 102, and MP 103.

Similarly, The MP 107 interfaces to the PC 105 and/or the MPS 106 via, for example, a wireless link or a wired link (e.g., a USB connection). The PC 105 and the MPS 106 interface to a broadband access headend 110. The broadband access headend 110 may comprise a cable headend, a satellite headend, or a DSL headend, in accordance with various embodiments of the present invention. As an option, the MP 107 may interface with the broadband access headend 110. The PC 105, MPS 106, and/or MP 107 may include internal modems (e.g., a cable modem or DSL modem) or other interface device in order to communicate with the broadband access headend 110. Optionally, the interface device (e.g., modem) may be external to the PC 105, MPS 106, and MP 107.

The media exchange network 100 further comprises a broadband access headend 111 connected between a $3^{rd}$ home 112 and an Internet infrastructure 115, a media exchange server 113 (as in the case of a single central server supporting the media exchange network 100) and, optionally, at least one other media exchange server 114 (as in the case of a multiple server architecture) supporting the media exchange network 100 connected to the Internet infrastructure 115. That is, an embodiment of the present invention may comprise more than two media exchange servers strategically located at various points in the media exchange network 100.

The broadband access headends 109 and 110 also interface to the Internet infrastructure 115. The broadband access headend 111 may comprise a cable headend, a satellite headend, or a DSL headend, in accordance with various embodiments of the present invention. The $3^{rd}$ home 112 may also include a PC, a MPS, and/or a MP as part of the media exchange network 100.

The media exchange network 100 also comprises a media storage server 116 and a $3^{rd}$ party media server 117, both interfacing to the Internet infrastructure 115. The media storage server 116 interacts with the media exchange server 113 and provides temporary and/or archival storage for digital media on the media exchange network 100. For example, the media storage server 116 may temporarily hold media files that are addressed to certain MPS's and/or PC's on the media exchange network 100.

The $3^{rd}$ party media server 117 may store movies, video, user profiles, and other digital media that may be provided to users of the media exchange network 100.

The media exchange network 100 further comprises a manufacturer's server 118 connected to the Internet infrastructure 115. The manufacturer's server 118 is provided by a manufacturer of devices that may be used on the media exchange network 100 and provides certain manufacturer services.

Each of the elements of the media exchange network 100 may be identified by a network protocol address such as, for example, an Internet protocol (IP) address, a media access control (MAC) address, an electronic serial number (ESN), etc. Examples of elements that may be identified by such addresses include PC's such as PC 101 and 105, MPS's such as MPS 102 and 106, and MP's such as MP 103 and 107.

In accordance with an alternative embodiment of the present invention, a broadband access headend may be upgraded to a media exchange headend by adding functionality to facilitate the exchange of media on the media exchange network in conjunction with the media exchange server. Such functionality may include billing, distributed networking capability, archival functionality (long term media storage), temporary storage (to aid in the distribution and routing of media), storage management, and digital rights management.

The media exchange server architecture solves the problem of secure billing/payment and authorization for media services on the media exchange network 100. The media exchange servers 113 and 114 provide functionality on the media exchange network 100 including billing/payment, device registration, channel/program setup and management, and security.

The various elements of the media exchange network 100 include storage locations for digital media and data. The storage locations may comprise, for example, hard disk drives, a DVD player, a CD player, floppy disk drives, RAM, or any combination of these. The storage locations may also include, for example, memory sticks, PCMCIA cards, compact flash cards, or any combination of these.

The PC's (101 and 105) may comprise desktop PC's, notebook PC's, PDA's, or any computing device.

The MPS's (102 and 106) are essentially enhanced set-top-boxes. The MPS's (102 and 106) may each include a TV screen for viewing and interacting with various user interfaces, media, data, and services that are available on the media exchange network using, for example, a remote control. The PC's 101 and 105 may each include a PC monitor for viewing and interacting with various user interfaces, media, data, and services that are available on the media exchange network using, for example, a keyboard and mouse. The MPS's, PC's, and/or MP's include functional software to support interaction with the media exchange servers and media peripherals on the media exchange network 100, in accordance with various embodiments of the present invention.

For example, the functional software may comprise a MES (media exchange software) platform providing certain functionality such as billing/payment for media services, the ability to access, process, and push media content on the media exchange network 100, and the ability to display media content on a screen. The screen may act as a user interface for the selection and display of media content and messages.

In accordance with various embodiments of the present invention, a MPS may comprise a set-top-box (STB), a PC, or a TV with a media management system (MMS). A MMS is also known herein as a media exchange software (MES) platform.

A MMS comprises a software platform operating on at least one processor to provide certain functionality including user interface functionality, distributed storage functionality, and networking functionality. For example, a MMS may provide control of media peripheral devices, status monitoring of media peripheral devices, and inter-home MPS routing selection, in accordance with an embodiment of the present invention.

The media peripherals (103 and 107) of the media exchange network 100 may include, for example, a digital camera, a digital camcorder, a television, a personal computer, a CD player, a MP3 player, a home juke-box system, a multi-media PDA (personal digital assistant), a multi-media gateway device, a DVD player, a tape player, and various home appliances.

In an embodiment of the present invention, a digital certificate is embedded in the firmware or hardware of a new (i.e., non-legacy) MP. The digital certificate comprises certain information including a device ID, a public key for encryption, and possibly other information related to services, payment terms, billing, and media push/access restrictions and limitations. The digital certificate may be installed in the MP by the manufacturer or seller at the time of purchase. Alternatively, the digital certificate may be downloaded by the manufacturer to the MP, over a media exchange network, via a PC or a MPS when a user first connects the MP to a PC or a MPS.

Other embodiments of the present invention may comprise various combinations and/or multiple instantiations of the elements of FIG. 1, in accordance with various aspects of the present invention.

Media content on a media exchange network 100 may originate from media peripherals, home appliances, PC's, and remote service providers. The media content may comprise many forms of digital media including digital video, digital images, digital audio, documents, etc.

A user of the media exchange network 100 may desire to have access to certain media exchange services provided by the media exchange network 100 and would like to gain access to and pay for those services in an easy and straightforward manner. The services may comprise providing access to certain broadcast channels that are available on the media exchange network through, for example, a cable provider. The services may also include authorization to set up and share certain media channels on the media exchange network 100, storage and routing services on the media exchange network 100, and authorization to interact with certain other users on the media exchange network.

For example, a user may desire access to certain media channels provided by the $3^{rd}$ party media server 117. The channels may include broadcast TV programs, Internet-based radio channels, special news programming, special sporting events, etc. The $3^{rd}$ party media server 117 may also provide on-demand movies, videos, and other media as well, in accordance with various embodiments of the present invention.

A user of the media exchange network 100 may desire to upload media content from the MPS 102, for example, to the media storage server 116. The media storage server may serve as the user's backup for his media content.

For the purposes of billing and payment, the media exchange network may support pre-payment, concurrent payment (i.e., pay-per-consumption), and post-payment options in accordance with various embodiments of the present invention. With a pre-payment option, all media exchange services provided are paid for ahead of time, before the services are used. With the concurrent payment option, a media exchange service is paid for immediately before the particular service is used. With the post-payment option, a media exchange service is paid for after the service is used. For example, a user may be billed at the end of the month. Also, a subscription for access to media services over a pre-defined time period may be set up. In accordance with an embodiment of the present invention, a user may set up pre-arranged access to the media exchange network 100 over the telephone or from a web site on the Internet using, for example, the PC 101.

In accordance with an embodiment of the present invention, billing support and functionality may be handled by the media exchange server 113. When a user accesses billable media services on the media exchange network 100, all billing and payment functions are processed through the central media exchange server 113. The media exchange server 113 may be linked to, for example, a cable service provider or a satellite service provider at a broadband access headend via the Internet and/or a telephony infrastructure (e.g., DSL). The media exchange server 113 coordinates billing and payment functions between a service provider and a consumer on the media exchange network 100.

In accordance with an alternative embodiment of the present invention, billing/payment support and functionality may be handled in a distributed manner across the media exchange network 100. For example, the $3^{rd}$ party media server 117 may perform initial billing and payment processing for a user of a MPS at the $3^{rd}$ home 112, and then reconcile with another server 114 near the broadband access headend 111.

Payment, contract terms, and other functions associated with accessing media services on the media exchange network 100 may be performed by any device (e.g., MPS, PC, MP) on the media exchange network 100, in accordance with an embodiment of the present invention. A personal media exchange network payment profile for a user may be set up and stored, for example, in the user's MPS or PC, or in the media exchange server 113. The personal media exchange network payment profile enables all of the billing and payment activities (i.e., functions) associated with a user of the media exchange network 100.

FIG. 2A is a flowchart of an embodiment of a method 200 to perform billing for media services on the media exchange network 100 of FIG. 1, in accordance with various aspects of the present invention. In step 201, a device on a media exchange network (e.g., a MPS) requests media content from a $3^{rd}$ party media provider via a media exchange server. In step 202, the media exchange server checks to see if the media content has already been paid for (i.e., pre-paid option). If the media content has already been paid for then, in step 203, the media content is delivered to the device via the media exchange network. Otherwise, in step 204, if the device indicates that payment will be made now then, in step 205, the media exchange server obtains credit card information from the device and bills the credit card. Then, in step 203, the media content is delivered to the device via the media exchange network. Otherwise, in step 206, an account corresponding to a user of the device is billed for the media content and then, in step 203, the media content is delivered to the device via the media exchange network.

As an example, referring to FIG. 1, a user at the first home 104 desires to order a video of a movie from the $3^{rd}$ party media server 117 via the user's MPS 102. The MPS 102 sends a request to the media exchange server 113 for the video. The media exchange server 113 checks to see if the user has already paid for the video and discovers that he has not. The media exchange server 113 sends a reply to the MPS 102 asking if the user wants to pay for the video now or be billed. The user indicates to the media exchange server 113 via the MPS 102 that he would like to be billed. The media exchange server 113 proceeds to bill a pre-established account of the user and instructs the $3^{rd}$ party media server 117 to push the video to the MPS 102 via the media exchange network 100.

Figure 2B:
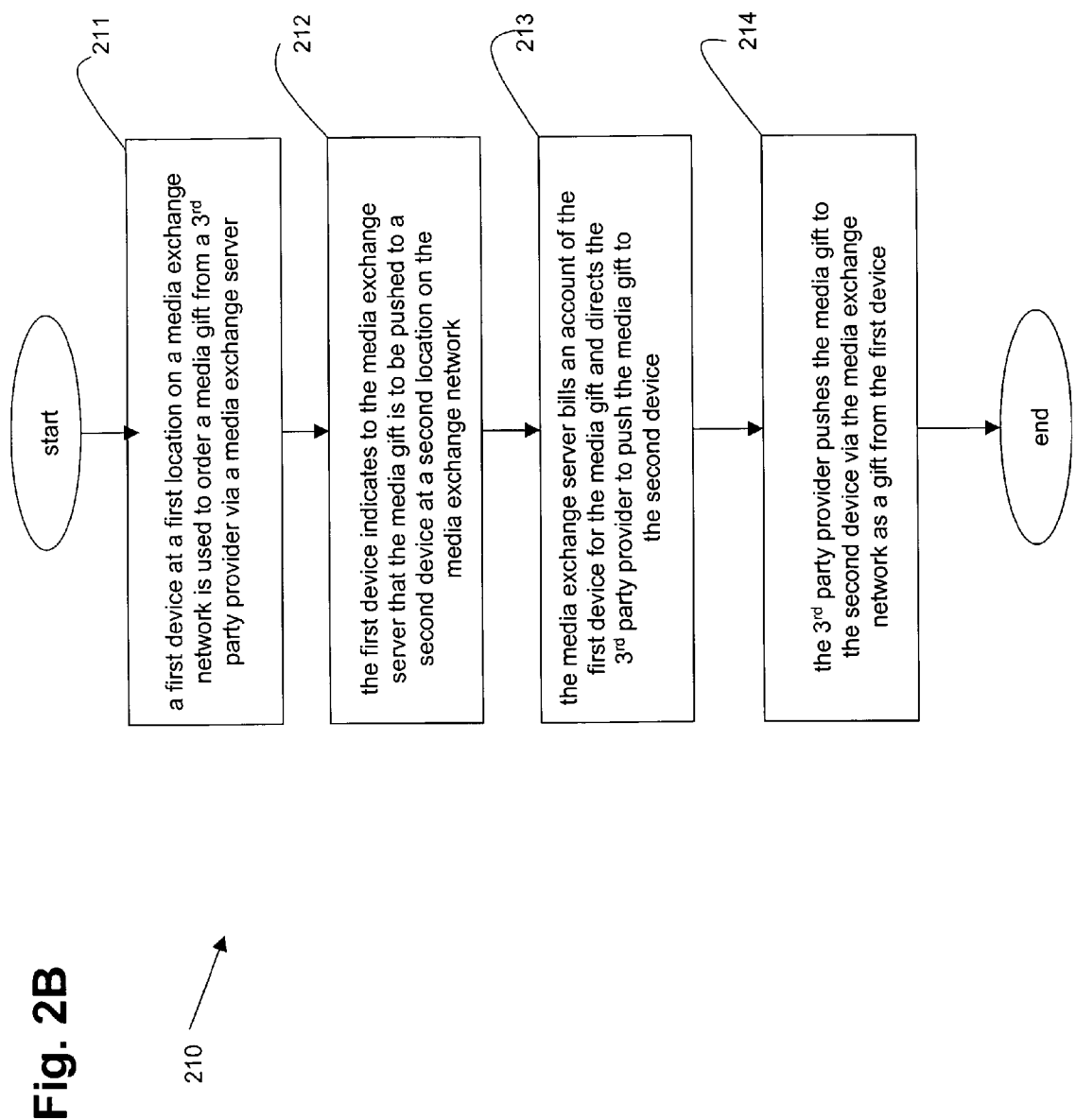
FIG. 2B is a flowchart of an embodiment of a method to order media content on the media exchange network of FIG. 1 and have the media content delivered to a second party as a gift, in accordance with various aspects of the present invention.

FIG. 2B is a flowchart of an embodiment of a method 210 to order media content on the media exchange network 100 of FIG. 1 and have the media content delivered to a second party as a gift, in accordance with various aspects of the present invention. In step 211, a first device at a first location on a media exchange network is used to order a media gift (i.e., media content) from a $3^{rd}$ party media provider via a media exchange server. In step 212, the first device indicates to the media exchange server that the media gift is to be delivered to a second device at a second location on the media exchange network. In step 213, the media exchange server bills an account of the first device for the media gift and directs the $3^{rd}$ party media provider to push the media gift to the second device. In step 214, the $3^{rd}$ party media provider pushes the media gift to the second device via the media exchange network as a gift from the user of the first device.

As an example, referring to FIG. 1, a user of the PC 105 at the $2^{nd}$ home 108 desires to order and pay for a video course for a user of the MPS 102 at the $1^{st}$ home 104. The user at the $2^{nd}$ home 108 communicates via the PC 105 with the media exchange server 113 to order and pay for the video course. The media exchange server 113 bills a pre-established account of the user at the $2^{nd}$ home 108 and directs a $3^{rd}$ party media server 117 to push the video course to the MPS 102 at the $1^{st}$ home 104. The $3^{rd}$ party media server proceeds to push the video course to the MPS 102 as a pre-paid gift from the user of the PC 105 at the $2^{nd}$ home 108.

FIG. 2C is a flowchart of an embodiment of a method 220 using a digital certificate within a media peripheral device to obtain media content via a manufacturer of the device, in accordance with various aspects of the present invention. In step 221, a media peripheral device is purchased having a digital certificate from a manufacturer. In step 222, the media peripheral device is connected to a media exchange network and is registered on the media exchange network. In step 223, the digital certificate within the media peripheral device is transmitted to a server of the manufacturer via the media exchange network. In step 224, the server of the manufacturer opens up the digital certificate and processes the information content of the digital certificate. In step 225, as a result of processing the digital certificate in step 224, the server of the manufacturer pays a $3^{rd}$ party media provider for media content and directs that the media content be delivered to the media peripheral device via the media exchange network.

For example, a user of the MP 103 at the $1^{st}$ home 104, having purchased the MP 103 from a manufacturer with a digital certificate embedded, connects the MP 103 to the media exchange network 100 via the PC 101. The MP 103 comprises a MP3 player 103 and the embedded digital certificate contains information allowing the user to obtain 50 songs for free from a manufacturer of the MP3 player 103. The MP3 player 103 is registered on the media exchange network 100 and the digital certificate within the MP3 player 103 is transmitted via the media exchange network 100 to the manufacturer's server 118. The server 118 opens and processes the digital certificate and proceeds to pay a $3^{rd}$ party media provider 117 for the songs. The $3^{rd}$ party media provider 117 then pushes the 50 songs to the MP3 player 103 via the media exchange network 100 through the PC 101.

Typically, a certificate key is provided by a certificate authority and is used to open a digital certificate. In accordance with an embodiment of the present invention, a certificate key may be provided to, for example, a MPS on the media exchange network.

Other embodiments that do not use digital certificates are possible as well. For example, in accordance with an alternative embodiment of the present invention, instead of a digital certificate being used, a user of a MP may enter a serial number and/or some other identifying code via his MPS or PC and send the serial number and/or code to the manufacturer's server via the media exchange network. The manufacturer's server responds by paying the $3^{rd}$ party media provider for media content and directs that the media content be delivered to the MP via the media exchange network.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a TV channel guide look-and-feel user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
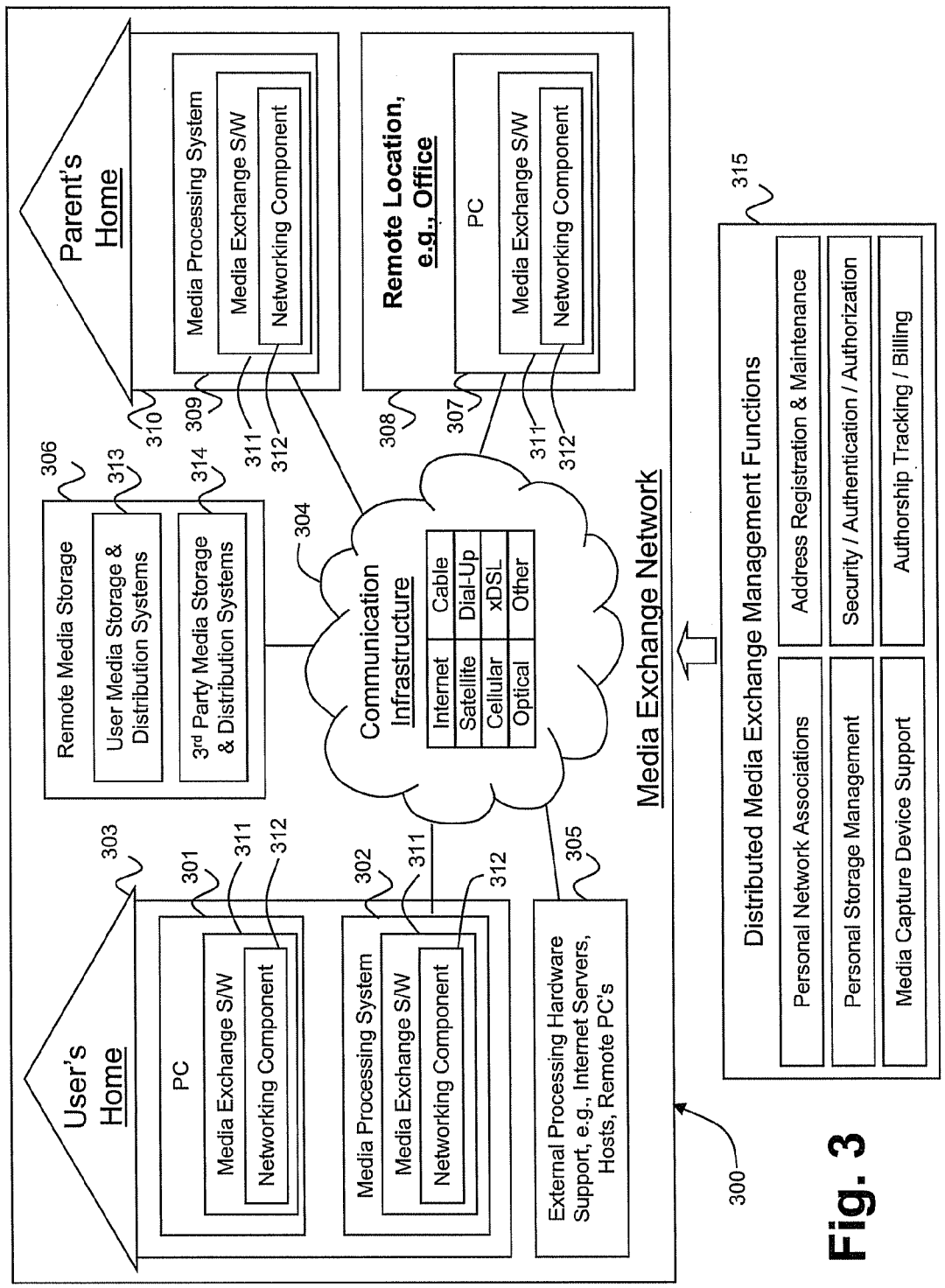
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
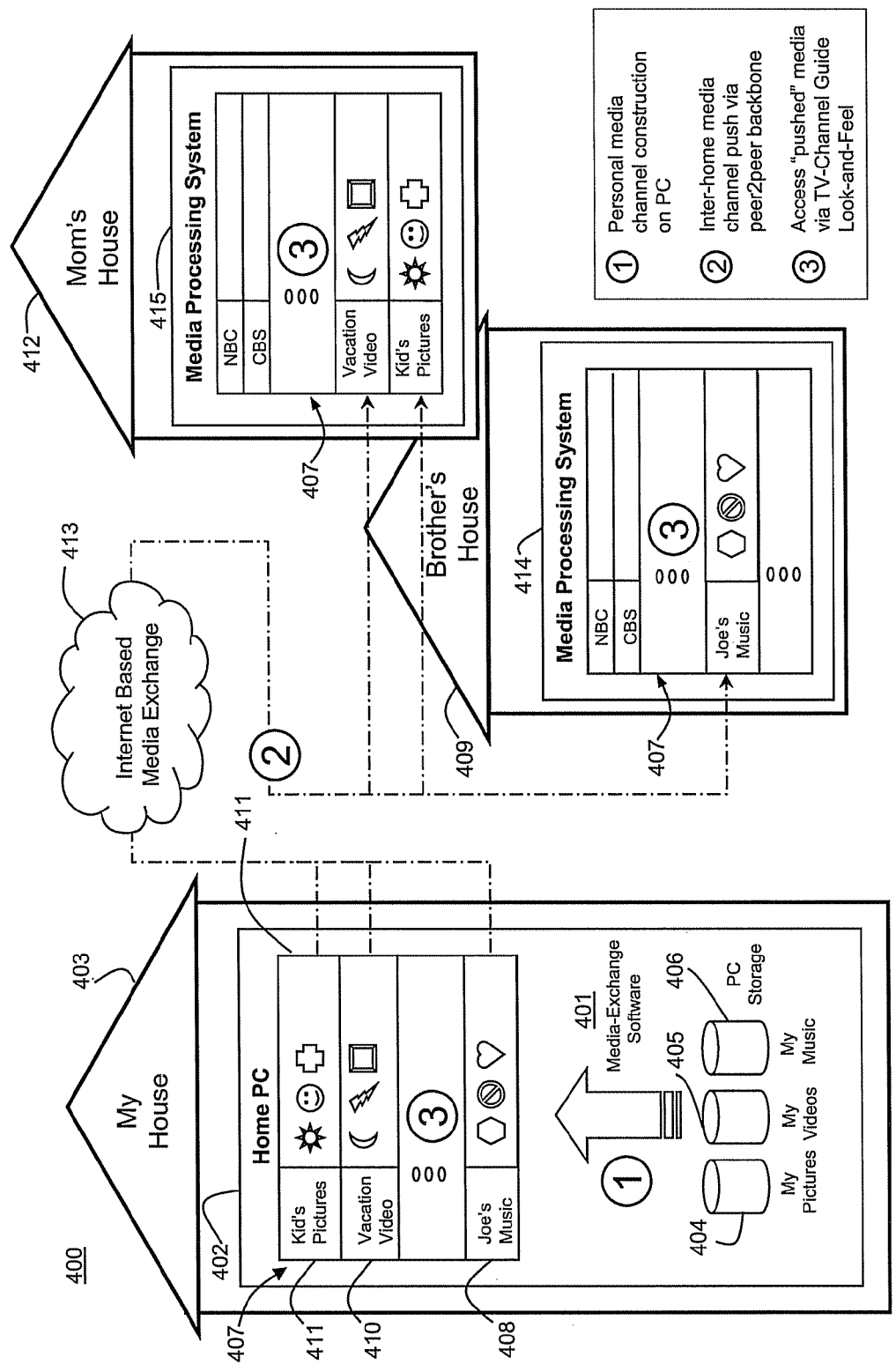
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a TV channel guide look-and-feel user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a TV channel guide look-and-feel user interface 407.

In step 3, brother and/or Mom access the pushed media channels via their respective media processing systems (MPS's) 414 and 415 using their respective MPS TV screens and remote controls.

Figure 5:
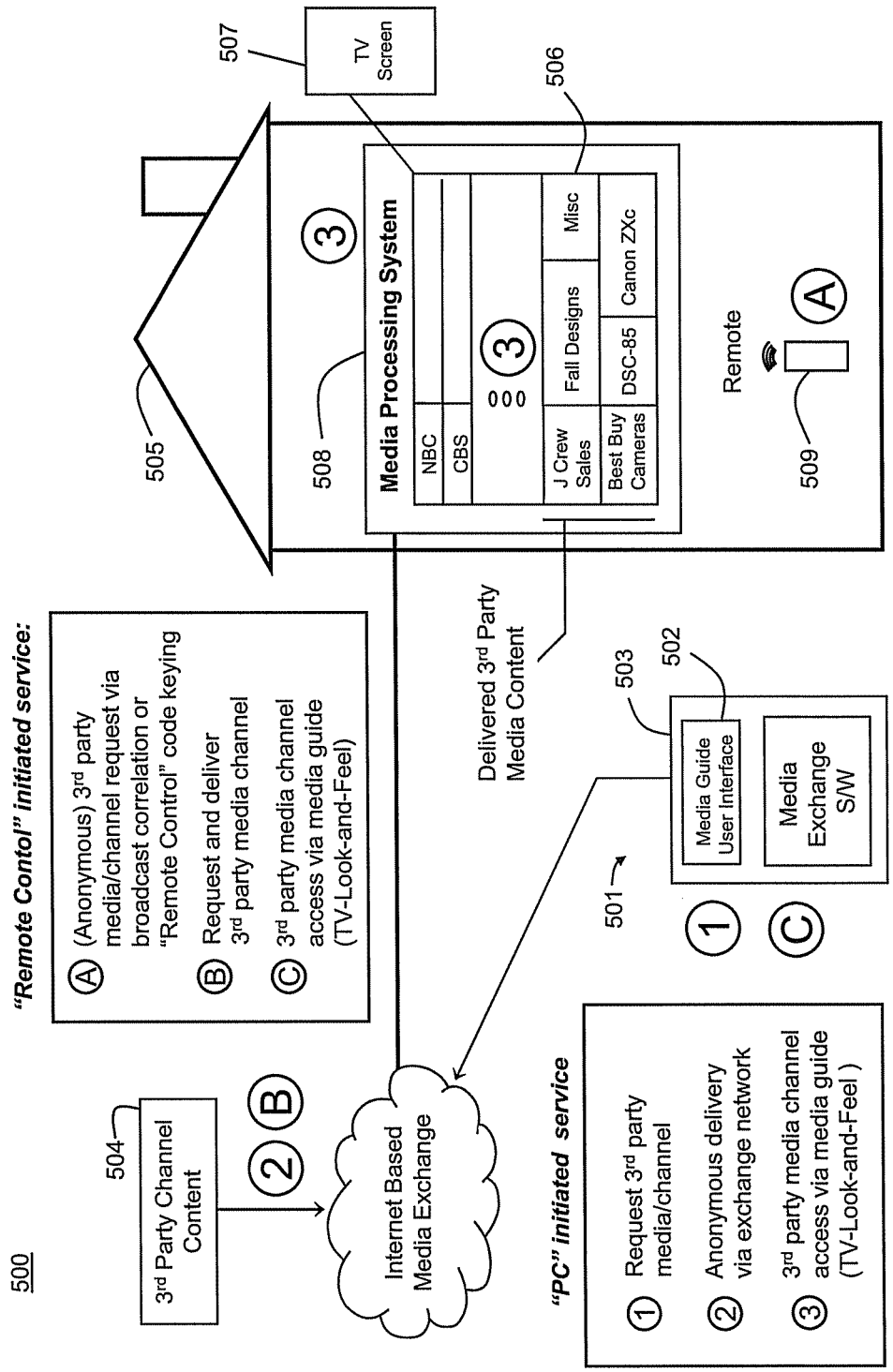
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a TV channel guide look-and-feel user interface 502 on a PC 503. In step 2, an anonymous delivery of the requested third-party channel 504 is made to a second party 505 via the internet-based media exchange network 500. In step 3, the second party 505 accesses the third-party channel 504 using a TV channel guide look-and-feel user interface 506 on a TV screen 507 that is integrated into an MPS 508.

Similarly, in step A, an MPS-initiated third-party request is made by a second party 505 via an internet-based media exchange network 500 using a TV channel guide look-and-feel user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a TV channel guide look-and-feel user interface 502 on a PC 503.

Figure 6:
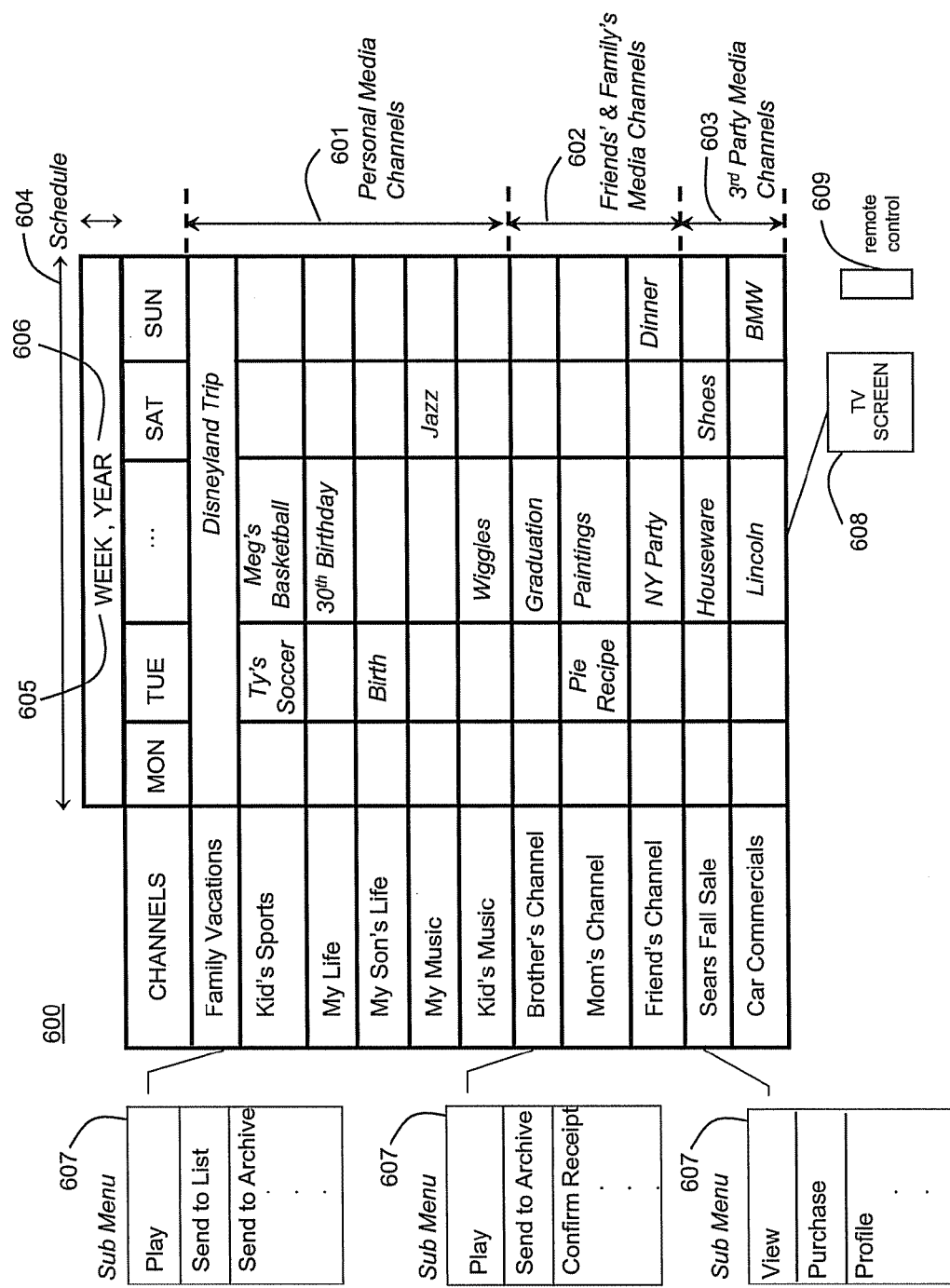
FIG. 6 is an exemplary illustration of a TV guide channel user interface in accordance with an embodiment of the present invention.

FIG. 6 illustrates a TV channel guide user interface 600 in accordance with an embodiment of the present invention. The TV channel guide user interface 600 may be displayed on a TV screen 608 and controlled by a remote control device 609. Also, the TV channel guide user interface 600 may be displayed on a PC monitor and controlled by a keyboard or mouse.

The TV channel guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
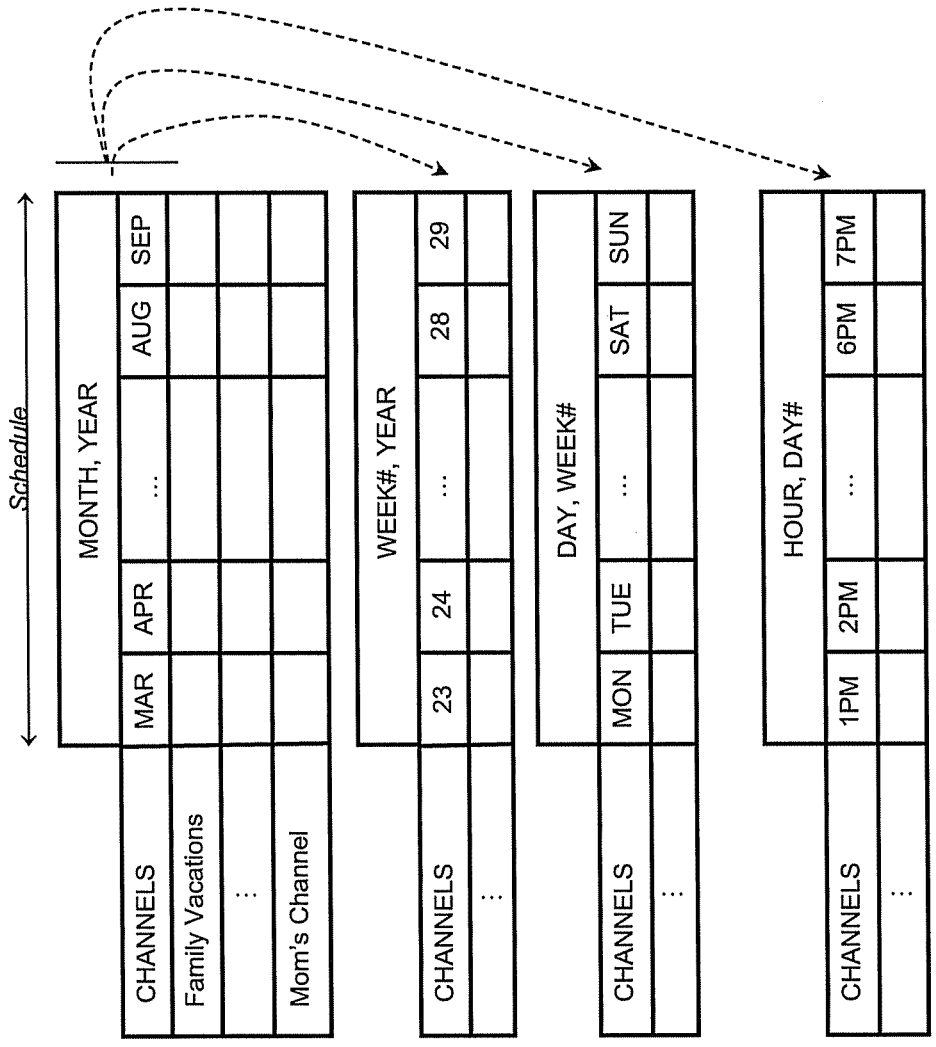
FIG. 7 is an exemplary illustration of several instantiations of a TV guide channel user interface of FIG. 4 in accordance with an embodiment of the present invention.

FIG. 7 illustrates possible multiple instantiations of a TV channel guide user interface 700 in accordance with an embodiment of the present invention. The TV channel guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The TV channel guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
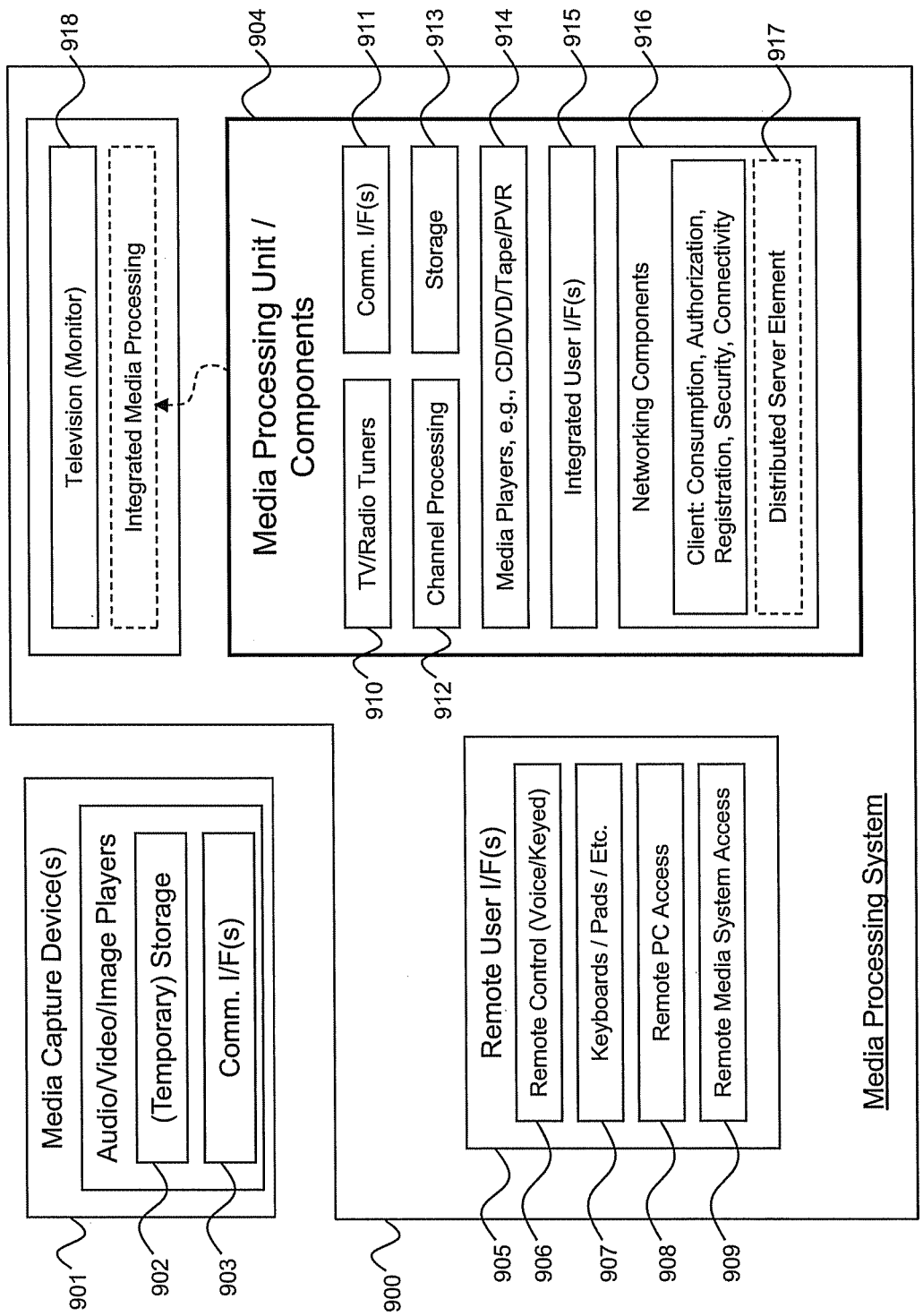
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite head end.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
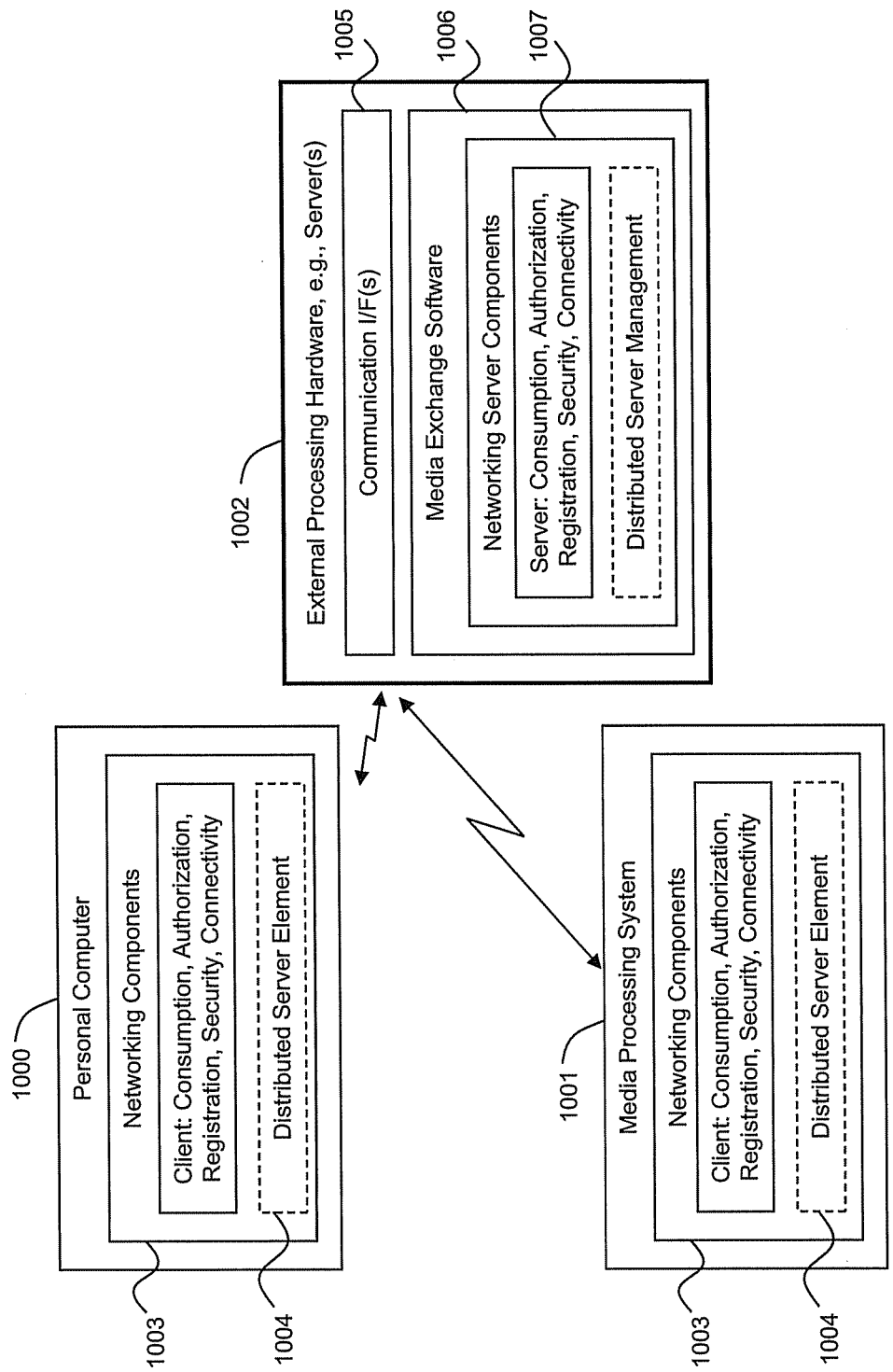
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
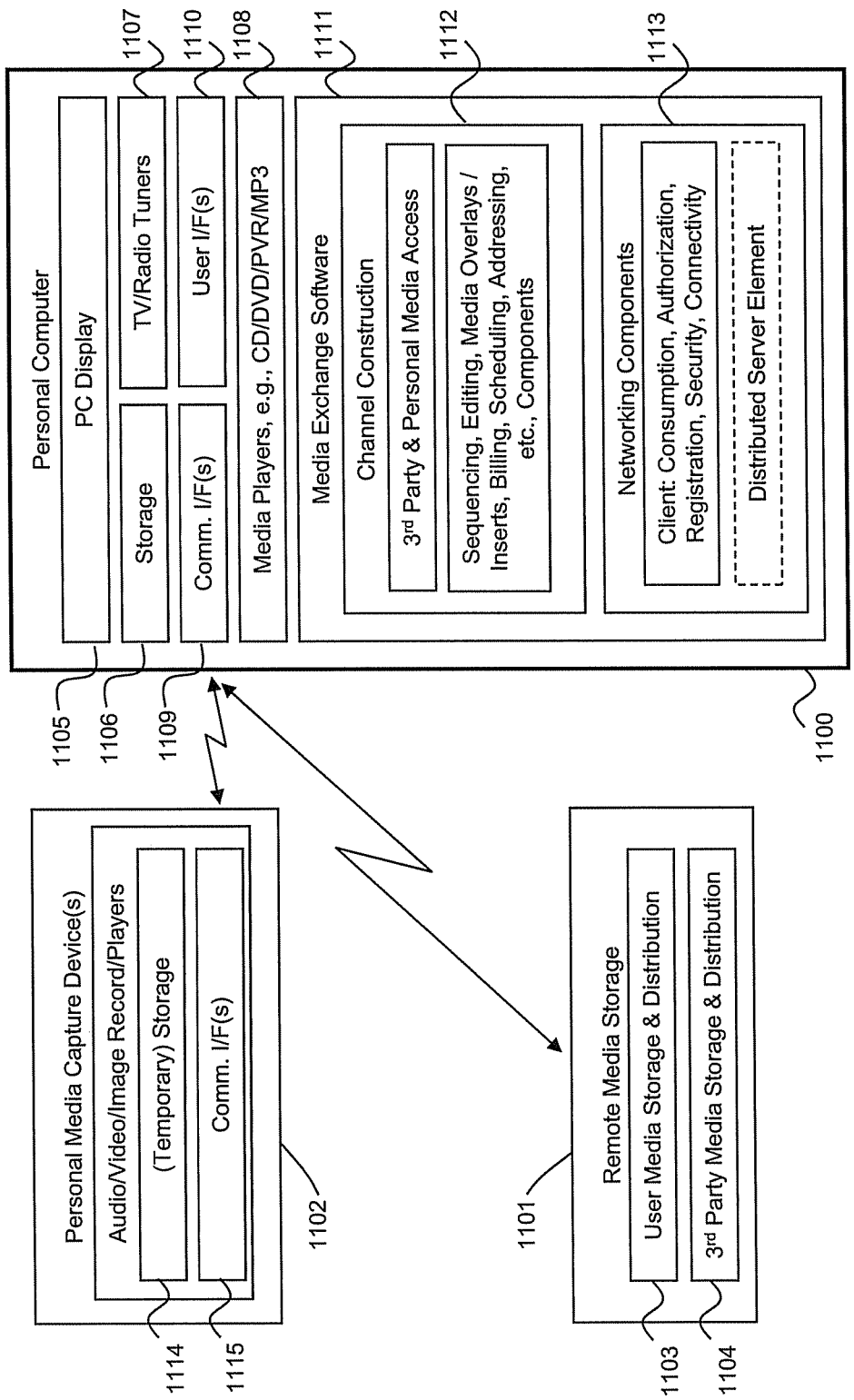
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

In summary, a system and method support billing and payment on a media exchange network.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system for use in a communication terminal at a first location in a media exchange network, the system comprising:
    at least one processor for operably coupling to at least one interface for communicating via a broadband communication infrastructure, the at least one processor enabling creation by a first user at the first location of one or more media channels for distribution to an authorized second user at a second location remote from the first location, wherein the one or more media channels comprises media content selected by the first user and arranged according to times specified by the first user; and
    wherein each of the one or more media channels comprises a sequence of media content selected by the first user, which is made available for consumption by the second user of the media exchange network at times scheduled by the first user, and wherein the one or more media channels are pushed by the first user at the first location to the second user at the second location.

2. The system of claim 1, wherein the broadband communication infrastructure comprises a cable network.

3. The system of claim 1, wherein the broadband communication infrastructure comprises a digital subscriber line (DSL) network.

4. The system of claim 1, wherein the media content of a media channel is stored at the first location.

5. The system of claim 1, wherein at least a portion of the media content of a media channel is provided by a third party source remote from the first and second user locations.

6. The one or more circuits of claim 1, wherein the media exchange network comprises a media exchange server that associates authorized users as members of a personal network.

7. The one or more circuits of claim 6, wherein the media exchange server is located within the communication terminal of the first user.

8. The one or more circuits of claim 1, wherein media content comprises one or more of digitized video, digitized audio and one or more digitized still images.

9. The one or more circuits of claim 1, wherein a first user is enabled to anonymously request delivery of media content from a third party to the second user.

10. The one or more circuits of claim 1, wherein the sequence of media content selected by the first user is received by and stored at the location of the second user prior to the time of availability scheduled by the first user, for consumption at the time of availability scheduled by the first user.

11. The one or more circuits of claim 1, wherein the sequence of media content selected by the first user is pushed to the communications terminal of the second user.

12. A server for use in a media exchange system, the server comprising:
    a communication interface configured to receive, from a first device at a first location on a media exchange network, a request for a media gift to be pushed to a second device at a second location on the media exchange network;
    processing circuitry configured to conditionally grant permission for the media gift to be pushed to the second device based, at least in part, on a payment status associated with the media gift; and
    the communication interface further configured to transmit an instruction directing the media gift to be pushed to the second device in response to permission being granted.

13. The server of claim 12, wherein:
    the media gift comprises media content provided by a third party; and
    the communication interface is further configured to transmit the instruction to a third party server.

14. The server of claim 12, wherein
    the media gift comprises media content stored at a network connected device at the first location; and
    the communication interface is further configured to transmit the instruction to the network connected device.

15. The server of claim 12, wherein the processing circuitry is further configured to obtain payment associated with the media gift prior to transmitting the instruction.

16. The server of claim 12, wherein the processing circuitry is further configured to bill an account associated with a user of the first device for pushing the media gift to the second device.

17. The server of claim 12, wherein the personalized media channel comprises a media channel stored at the first location.

18. A method for use in a media exchange system, the method comprising:
    receiving from a first device at a first location on a media exchange network, a request for a personalized media channel to be pushed to a second device at a second location on the media exchange network;
    determining whether the second device is authorized to access the personalized selection of media; and
    transmitting, to the second device in response to a favorable determination, an authorization to access the personalized media selection.

19. The method of claim 18, wherein the determining further comprises:
    determining a payment status associated with the personalized media channel.

20. The method of claim 18, wherein the personalized media channel is pushed to, and stored at, the second location prior to transmission of the authorization to access.

* * * * *

UNITED STATES PATENT AND TRADEMARK OFFICE
CERTIFICATE OF CORRECTION

PATENT NO. : 8,447,676 B2
APPLICATION NO. : 13/326601
DATED : May 21, 2013
INVENTOR(S) : Jehan Karaoguz et al.

Page 1 of 1

It is certified that error appears in the above-identified patent and that said Letters Patent is hereby corrected as shown below:

In the Claims

Col. 16, line 43, in claim 14: after "wherein" insert --;--

Signed and Sealed this
Eighteenth Day of February, 2014

Michelle K. Lee
*Deputy Director of the United States Patent and Trademark Office*